June 5, 1928.
C. W. AVELING
BALL PIPE JOINT
Filed June 5, 1924
1,671,975
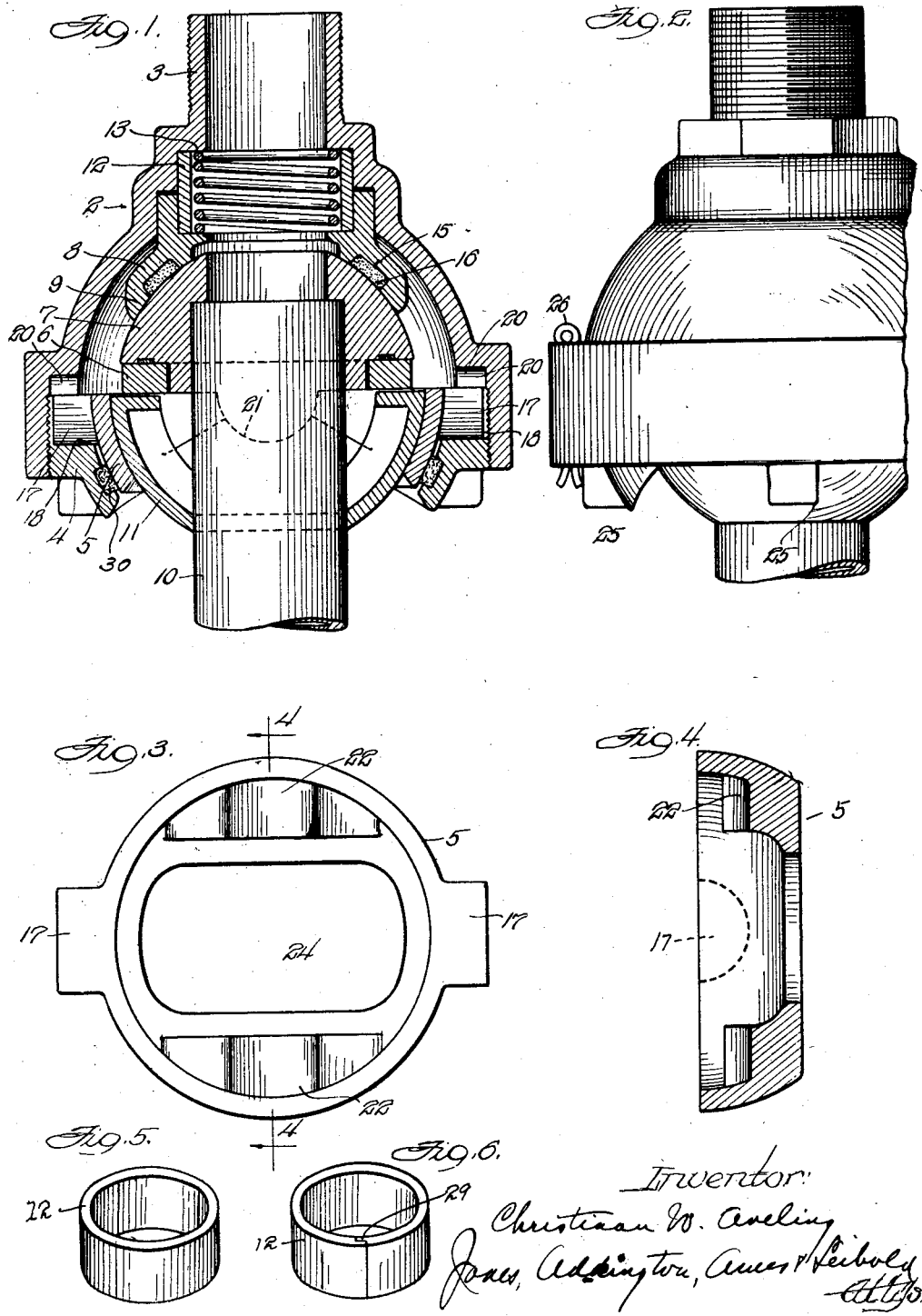

Patented June 5, 1928.

1,671,975

UNITED STATES PATENT OFFICE.

CHRISTIAAN W. AVELING, OF WHEATON, ILLINOIS, ASSIGNOR TO JULIA E. AVELING, OF WHEATON, ILLINOIS.

BALL PIPE JOINT.

Application filed June 5, 1924. Serial No. 717,913.

My invention relates to ball joint pipe connections.

Considerable difficulty has heretofore been experienced in the use of ball and socket pipe joints when employed particularly on railway cars to transmit steam from car to car. I find that in view of their location under the cars, they are subjected to excessive dust and other foreign matter working into the interior and between bearing surfaces. Moreover, in the prior design of these ball and socket pipe joints, it has been customary to provide the swivel below the trunnion permitting vertical oscillation. I also find that with such an arrangement, the various parts interlock when oscillated in either direction. In other words, the motion of the vertical trunnions results in the movement of the parts providing transverse or horizontal oscillation.

One of the objects of my invention is to provide a ball and socket pipe joint having provisions for excluding dust from the working parts.

A further object of my invention is to provide a ball and socket pipe joint having provisions whereby the ball and socket may be self-centering, and whereby the parts will not interlock when oscillated in either direction.

A further object of my invention is to provide a ball and socket pipe joint provided with an expansible element, operated either thermally or mechanically, whereby this element may be expanded tightly against the socket and casing to form a tight joint and hold the socket firmly in position against the ball. If accomplished thermally, the expansible element will be formed of a material having a higher coefficient of expansion than the socket and casing, so that when the steam is turned on, a tight joint will be obtained.

A further object of my invention is to provide an all metal ball and socket pipe joint.

A further object of my invention is to provide a ball and socket pipe joint which will be simple, durable and efficient.

Further objects will appear from the description and claims.

In the drawings—

Figure 1 is a transverse vertical section through a ball joint pipe connection embodying my invention;

Fig. 2 is an elevational view of the same;

Fig. 3 is a detail view looking downwardly into the rocker shell, oscillatably adapted to be mounted in the lower end casing;

Fig. 4 is a sectional view taken on line 4—4 of Fig. 3;

Fig. 5 is a perspective view of the expansible elements employed for interlocking the socket member to the casing; and, Fig. 6 is a similar view of this expansible element in modified form.

Referring to the drawings in detail, the construction shown therein comprises a casing member 2 having a screw threaded member 3 for connection with a pipe section, a lower shell 4, having a threaded connection with the casing member 2, a rocker shell 5 oscillatably mounted on the lower shell 4, a rocker ring 6 oscillatably mounted on the rocker shell 5, an apertured ball member 7, swivelled on the rocker ring 6, a socket member 8 having a spherical portion 9 cooperating with the ball member 7, a pipe section 10 secured in the apertured ball member 7, a spherical dust cap 11 surrounding the pipe 10 and seated in the rocker shell 5, a bronze tube or sleeve 12, the purpose of which will be described more fully hereinafter, and a spring 13 for pressing the socket member 8 into contact with the ball member 7.

The dust excluding ring 11 is carried by the lower shell 5 for sealing between this lower shell and the rocker shell to exclude dust. The socket member 8 is provided with an annular recess 15 to receive a suitable lubricating and sealing material 16, as graphite. Any suitable materials may be used for the various parts referred to. The casing, lower shell, rocker shell, ball member and socket member may be formed of cast iron. The rocker ring 6 may be of cast iron. The dust cap 11 may be of malleable or cast iron or steel. The tube 12 may be of bronze which has a higher co-efficient of expansion than the cast iron of the socket member and casing member.

For oscillatably mounting the rocker shell 5 on the lower shell 4, the rocker shell is provided with a pair of oppositely located semi-cylindrical trunnions 17, which are pivotally or oscillatably mounted in the semi-circular bearing recesses 18 in the lower shell 4. The casing member 2 is recessed, as indicated at 20, to provide clearance for the trunnions as the rocker shell oscillates.

For oscillatably mounting the rocker ring 6 on the rocker shell 5, the lower face of the rocker ring is provided with a pair of oppositely disposed semi-circular journal or trunnion members 21 which are oscillatably mounted in arcuate bearing recesses 22 formed integrally with the rocker shell 5. The trunnions 17 have a slight end-wise play in the lower shell 4 and the trunnion members 21 of the rocker ring having a slight end-wise play in the bearing recesses 22, so that the ball and socket members are free to align themselves as determined by the bronze tube 12, which positions the socket member 8.

When the steam is turned on, the bronze tube 12 expands more than the adjacent cylindrical portions of the casing 2 and socket member 8, so that a steam tight joint is formed. This expansion of the bronze tube also holds the socket member 8 firmly in position against any action of the steam pressure which might otherwise force the socket member away from the ball member against the action of the compression spring 13.

If the pipe 10 is oscillated on the trunnions 21, it carries with it the dust cap 11 which oscillates within the rocker shell 5, the pipe 10 having freedom to move back and forth in the slot 24 in the rocker shell 5.

The lower shell 4 may be provided with wrench-engaging lugs 25 to facilitate threading it into and out of the casing 2. A cotter pin 26 may be provided for preventing the lower shell 4 from becoming unthreaded. This cotter pin extends through the casing member and is so located as to intersect the threaded connection between the lower shell and the casing member, thus keying the lower shell 4 against rotation.

It will be noted that the lower end of the ball joint pipe connection is sealed against dust, grit, or other foreign matter by the dust cap 11, which is free to move with pipe section 10 in its oscillation about the trunnions 21. Slot 24 is of a length permitting free oscillation of the pipe section 10 without breaking the dust seal furnished by the dust cap 11, while the apertured disk excludes all dust that could possibly work past the cap 11 where the pipe 10 enters. I consider this an important feature of my invention and shall claim the same broadly.

A felt ring 30 may be recessed in the lower edge of the lower ring 4 for closing the space between this ring 4 and the rocker ring 5.

In Figs. 5 and 6, the expansible tube or ring 12 is illustrated in detail. In Fig. 5, this tube 12 is in the form of a thermal element which expands, when hot fluid flows past the joint of the cylindrical portions of the socket 8 and casing 2, for the purpose of covering this joint. In Fig. 6, an expansible spring ring is illustrated. The expansible spring ring is provided with an overlapping joint 29, and may be used as mechanical means for interlocking the socket 7 to the casing 2 in fluid tight relation, this being the function of the expansible ring whether mechanically or thermally expanded.

Without further elaboration, it will be noted that my invention provides a ball joint pipe connection having all its parts of metal, the swivel joints of which operate independently of each other, and which is dust-proof so that dirt and grit may not work between bearing surfaces. Further, the expansible ring serves to interlock the casing and socket together as a unit in fluid tight relation, preventing possibility of leakage and accomplishing proper centering of the parts.

I claim:

1. A ball and socket pipe joint comprising a ball member, a metal socket member cooperating with said ball member, a metal casing member for receiving said socket member, said casing and socket member having adjacent aligned cylindrical portions, and a metal tube fitting in said cylindrical portions and covering the joint between said cylindrical portions, said metal tube being of a material having a higher co-efficient of expansion than that of the material of the metal casing and socket member whereby when hot fluid flows through said joint said tube will be expanded tightly into said cylindrical portions to form a tight joint and to hold said socket member firmly in contact with said ball member against the action of fluid pressure.

2. A ball and socket joint comprising a ball member, a socket member cooperating with said ball member, a casing member for receiving said socket member, said casing and socket members having adjacent cylindrical portions, and an expansible element fitting in said cylindrical portions and covering the joint between said cylindrical portions, the expansibility of said element causing said element to assume a tight fit in said cylindrical portions to provide a fluid tight joint and to hold the socket member firmly in contact with said ball member against the action of fluid pressure.

3. A ball and socket pipe joint comprising a casing member, a rocker shell oscillatably mounted on said casing member, a rocker ring oscillatably mounted on said rocker shell, a ball swiveled on said rocker ring about an axis extending longitudinally of the pipe joint, and a socket cooperating with said ball.

4. A ball and socket pipe joint comprising a casing member, a rocker shell oscillatably mounted on said casing member, a rocker ring oscillatably mounted on said rocker shell, a ball carried by said rocker ring; and a socket cooperating with said ball, said rocker shell and rocker ring having provisions for axial play transversely of the axis of the pipe joint whereby the ball and socket are self adjusting.

5. A ball and socket pipe joint comprising a casing member, a bowl-shaped slotted rocker shell oscillatably mounted on said casing, a rocker ring oscillatably mounted on said rocker shell, a ball carried by said rocker-ring, a socket cooperating with said ball, and a pipe connected with said ball and oscillatable in said slot.

6. A ball and socket pipe joint comprising a casing member, a bowl-shaped slotted rocker shell oscillatably mounted on said casing, a rocker ring oscillatably mounted on said rocker shell, a ball carried by said rocker-ring, a socket cooperating with said ball, and a pipe connected with said ball and oscillatable in said slot, and a dust cap in said bowl-shaped rocker shell surrounding said pipe and closing said slot.

7. In a ball and socket pipe joint, the combination of a casing member, a socket member, a ball cooperating with said socket member, a pipe section entering said casing member at one end, a shell for closing said end of said casing, said ball positioned on said pipe section, means for providing oscillatable movement of said ball relative to said shell, said shell being provided with a slot therein in which said pipe section rocks, and a dust cap within said shell and covering said slot.

8. A ball and socket pipe joint comprising a ball member, a metal socket cooperating with said ball member, a metal casing member for receiving said socket member, said socket member being provided with a sleeve member fitting snugly in and centered by said casing member, said sleeve member being of a material having a higher co-efficient of expansion than the casing, whereby when hot fluid flows through said joint said sleeve member will expand tightly against the casing to form a tight joint and to hold said socket member firmly in contact with the ball member against the action of fluid pressure.

9. A ball and socket pipe joint comprising a socket member having a steam passage therethrough, a ball member having a steam passage therethrough, a pipe carried by the ball member in communication with the passage therein, a rocker member through which said pipe extends and on which said ball member is swivelled about an axis extending longitudinally of the axis of the pipe joint, a second rocker member on which said first rocker member is rockably mounted, and a separable two-part casing for housing said ball member, said socket member and said rocker members, and spring means for pressing said socket member against said ball member, said socket member being recessed to provide a condensation pocket between the socket and ball to prevent the escape of steam.

10. A ball and socket pipe joint comprising a socket member having a steam passage therethrough, a ball member having a steam passage therethrough, a pipe carried by the ball member in communication with the passage therein, a rocker member through which said pipe extends and on which said ball member is swivelled about an axis extending longitudinally of the axis of the pipe joint, a second rocker member on which said first rocker member is rockably mounted, and a separable two-part casing for housing said ball member, said socket member and said rocker members, and spring means for pressing said socket member against said ball member.

11. A ball and socket pipe joint comprising a socket member having a steam passage therethrough, a ball member having a steam passage therethrough, a pipe carried by the ball member in communication with the passage therein, a rocker member through which said pipe extends and on which said ball member is swivelled about an axis extending longitudinally of the axis of the pipe joint, a second rocker member on which said first rocker member is rockably mounted, and a separable two-part casing for housing said ball member, said socket member and said rocker members.

12. A ball and socket pipe joint comprising a socket member having a steam passage therethrough, a ball member having a steam passage therethrough, a pipe carried by the ball member in communication with the passage therein, a rocker member through which said pipe extends and on which said ball member is swivelled about an axis extending longitudinally of the axis of the pipe joint, a second rocker member on which said first rocker member is rockably mounted.

13. A ball and socket pipe joint comprising a casing member, a rocker shell oscillatably mounted on said casing member, a rocker ring oscillatably mounted on said rocker shell, a ball carried by said rocker ring, a socket cooperating with said ball, said rocker shell and said rocker ring having provisions for axial play transversely of the axis of the pipe joint whereby the ball and socket are self adjusting, said socket being provided with a sleeve centered by said casing and serving to center the socket, thereby positioning the rocker shell and rocker ring.

In witness whereof, I have hereunto subscribed my name.

CHRISTIAAN W. AVELING.